United States Patent
Liu (10) Patent No.: US 11,372,633 B2
(45) Date of Patent: Jun. 28, 2022

(54) METHOD, DEVICE AND TERMINAL APPARATUS FOR CODE EXECUTION AND COMPUTER READABLE STORAGE MEDIUM

(71) Applicant: SHENZHEN TINYSOFT CO., LTD., Shenzhen (CN)

(72) Inventor: Ermou Liu, Shenzhen (CN)

(73) Assignee: SHENZHEN TINYSOFT CO., LTD., Shenzhen (CN)

( * ) Notice: Subject to any disclaimer, the term of this patent is extended or adjusted under 35 U.S.C. 154(b) by 0 days.

(21) Appl. No.: 16/959,815

(22) PCT Filed: Jan. 4, 2018

(86) PCT No.: PCT/CN2018/071304
§ 371 (c)(1),
(2) Date: Oct. 7, 2020

(87) PCT Pub. No.: WO2019/134084
PCT Pub. Date: Jul. 11, 2019

(65) Prior Publication Data
US 2021/0026610 A1    Jan. 28, 2021

(51) Int. Cl.
*G06F 8/41* (2018.01)
*G06F 9/52* (2006.01)

(52) U.S. Cl.
CPC ............... *G06F 8/451* (2013.01); *G06F 9/52* (2013.01)

(58) Field of Classification Search
CPC .................................. G06F 8/451; G06F 9/52
See application file for complete search history.

(56) References Cited

U.S. PATENT DOCUMENTS

| 7,370,156 | B1 | 5/2008 | Nguyen et al. | |
| 8,566,804 | B1* | 10/2013 | Carrick | G06F 9/5066 |
| | | | | 717/135 |
| 8,990,783 | B1* | 3/2015 | Yu | G06F 9/4887 |
| | | | | 717/131 |
| 9,841,958 | B2* | 12/2017 | Ringseth | G06F 8/436 |

(Continued)

FOREIGN PATENT DOCUMENTS

| CN | 102098223 A | 6/2011 |
| CN | 102289347 A | 12/2011 |

(Continued)

OTHER PUBLICATIONS

Augusto Mendes Gomes Junior et al., "A parallel application programming and processing environment proposal for grid computing" (Year: 2012).*

(Continued)

*Primary Examiner* — Phillip H Nguyen
(74) *Attorney, Agent, or Firm* — Cantor Colburn LLP (57) ABSTRACT

The present application relates to the technical field of computer, and provides a method, a device and a terminal apparatus for code execution and a computer readable storage medium. The present application provide an identifier for parallel processing, and the user can use the parallel processing identifier to identify code statements that need to be processed in parallel in advance. During the execution of the code, when the parallel processing identifier is found in the current code statement to be executed, the task to be processed indicated by the current code statement to be executed is distributed to a preset grid computing system Perform multi-thread parallel processing. During the execution of this code statement, the user can continue to execute the next code statement.

14 Claims, 5 Drawing Sheets

(56) References Cited

U.S. PATENT DOCUMENTS

| | | | |
|---|---|---|---|
| 9,846,628 B2 | 12/2017 | Essey et al. | |
| 10,521,272 B1* | 12/2019 | Moniz | G06F 9/4843 |
| 2006/0136883 A1* | 6/2006 | Gebhart | G06F 9/5072 |
| | | | 717/140 |

FOREIGN PATENT DOCUMENTS

| | | |
|---|---|---|
| CN | 103064668 A | 4/2013 |
| CN | 103942099 A | 7/2014 |
| CN | 107122246 A | 9/2017 |

OTHER PUBLICATIONS

Lee et al., "Script: An Operational Semantics for Grid Computing Modeling" (Year: 2011).*
Creel et al., "Multi-core CPUs, Clusters, and Grid Computing: A Tutorial" (Year: 2008).*
Schulz et al., "Parallel SAT Solving on Peer-to-Peer Desktop Grids" (Year: 2010).*
Dong et al., "Scheduling Algorithms for Grid Computing: State of the Art and Open Problems" (Year: 2006).*
English Translation to International Search Report for Application No. PCT/CN2018/071304.
International Search Report for Application No. PCT/CN2018/071304.
Written Opinion for Application No. PCT/CN2018/071304.
CN First Office Action Application No. 201810007169.8.
English Translation to CN First Office Action Application No. 201810007169.8.
https://bbs.csdn.net/topics/230002; Publication date: May 5, 2009.

* cited by examiner

```
Function MainProg(N);
Begin
    c:=array();
    for i:=1 to N do
    begin
        c[i-1]:=#subProc(i,i);
    end;
    d:=#sum(c);
    e:=#stddev(c);
    return d/e;
End;

function SubProc(a,b)
begin
    for j=0 to 999999 do
```

Resources do not compete and operating in parallel

"c" causes resource blocking to "sum"

"d" and "e" are computing in parallel

Block waiting for "d", "e" resources

METHOD, DEVICE AND TERMINAL APPARATUS FOR CODE EXECUTION AND COMPUTER READABLE STORAGE MEDIUM

CROSS REFERENCE TO RELATED APPLICATIONS

This application is a National Stage of PCT Application No. PCT/CN2018/071304 filed on Jan. 4, 2019, the contents of which are incorporated herein by reference thereto.

TECHNICAL FIELD

The present application relates to the technical field of computer, and more particularly to a method, a device and a terminal apparatus for code execution and a computer readable storage medium.

BACKGROUND

In the prior art, when a code is executed, it is generally carried out in the order of the code statements, and only after the execution of the current code statement is completed and the result is returned, a next code statement will continue to be executed. This serial processing method consumes a lot of time when processing codes involving a large number of complex operations, and the processing efficiency is low.

TECHNICAL PROBLEM

In view of above, embodiments of the present application provides a method, a device and a terminal apparatus for code execution and a computer readable storage medium, in order to solve the problems that the existing method consumes a lot of time when processing codes involving a large number of complex operations, and the processing efficiency is low.

SUMMARY

A first aspect of an embodiment of the present application provides a method for code execution, which can include:

judging, during execution of a target code, whether there is a preset parallel processing identifier in a current code statement to be executed;

distributing a task to be processed indicated by the current code statement to be executed to a preset grid computing system for multi-thread parallel processing if the parallel processing identifier is in the current code statement to be executed, wherein the grid computing system comprises more than two compute nodes;

determining a next code statement after the current code statement to be executed as a new current code statement to be executed, and then returning to execute the step of judging whether there is a preset parallel processing identifier in a current code statement to be executed until execution of the target code is completed.

Further, before judging whether there is a preset parallel processing identifier in a current code statement to be executed, which further includes:

judging whether there is an input variable whose data type is a preset grid computing type in the current code statement to be executed, and the grid computing type being a data type that requires multi-thread parallel processing in the grid computing system;

acquiring a current processing state of the input variable if there is an input variable whose data type is the grid computing type in the current code statement to be executed;

returning to execute the step of acquiring the current processing state of the input variable until the current processing state of the input variable being the completed state if the current processing state of the input variable is an incomplete state;

executing the step of judging whether there is a preset parallel processing identifier in a current code statement to be executed if the current processing state of the input variable is a completed state.

Further, the step of distributing a task to be processed indicated by the current code statement to be executed to a preset grid computing system for multi-thread parallel processing includes:

acquiring a current number of tasks of each compute node in the grid computing system, respectively;

calculating the number of tasks that can be processed by each compute node according to the current number of tasks of each compute node and a preset threshold of the number of tasks of each compute node;

distributing the task to be processed to the compute node with a largest number of tasks that can be processed for processing.

Further, the step of distributing a task to be processed indicated by the current code statement to be executed to a preset grid computing system for multi-thread parallel processing further includes:

acquiring historical task processing records of each compute node within a preset statistical time period, respectively;

counting a first duration of each compute node when a processing state is normal, and a second duration of each compute node when a processing state is abnormal according to the historical task processing records;

calculating a reliability of each compute node according to the first duration and the second duration, the reliability being positively related to the first duration and negatively related to the second duration;

calculating a priority of each compute node according to the number of tasks that can be processed and the reliability, the priority being positively related to the number of tasks that can be processed and positively related to the reliability;

distributing the task to be processed to the compute node with the highest priority for processing.

Further, the method for code execution can further include:

acquiring a current processing state of each compute node in the grid computing system;

transferring unprocessed tasks of the compute node whose current processing state is abnormal to the compute node whose current processing state is normal to continue processing if there is a compute node whose current processing state is abnormal in the grid computing system.

A second aspect of an embodiment of the present application provides a device for code execution, which can include:

a parallel processing identifier judgment module, configured for judging, during execution of a target code, whether there is a preset parallel processing identifier in a current code statement to be executed;

a task distribution module, configured for distributing a task to be processed indicated by the current code statement to be executed to a preset grid computing system for multi-thread parallel processing if the parallel processing identifier is in the current code statement to be executed, wherein the grid computing system comprises more than two compute nodes;

a current statement to be executed determination module, configured for determining a next code statement after the current code statement to be executed as a new current code statement to be executed.

Further, the device for code execution further includes:

a grid computing type judgment module, configured for judging whether there is an input variable whose data type is a preset grid computing type in the current code statement to be executed, and the grid computing type is a data type that requires multi-thread parallel processing in the grid computing system;

a variable processing state acquiring module, configured for acquiring a current processing state of the input variable if there is an input variable whose data type is the grid computing type in the current code statement to be executed.

Further, the task distribution module can include:

a current number of tasks acquiring unit, configured for acquiring a current task number of each compute node in the grid computing system, respectively;

a number of tasks that can be processed calculation unit, configured for calculating the number of tasks that can be processed of each compute node according to the current number of tasks of each compute node and a preset threshold of the number of tasks of each compute node;

a first distribution unit, configured for distributing the task to be processed to the compute node with the largest number of tasks that can be processed for processing.

A third aspect of an embodiment of the present application provides a terminal apparatus for code execution, which includes: a storage device, a processor, and a computer program stored in the storage device and executable on the processor; and the steps of the method for code execution above are implemented when the processor executes the computer program.

A fourth aspect of an embodiment of the present application provides a computer readable storage medium for storing a computer program, and the steps of the method for code execution above are implemented when a processor executes the computer program.

Beneficial Effects

Compared with the prior art, the embodiments of the present application have the following beneficial effects: the embodiments of the present application provide a parallel processing identifier, and the user can use the parallel processing identifier to identify code statements that need to be parallel processed in advance. During the execution of a code, when the parallel processing identifier is found in the current code statement to be executed, the task to be processed indicated by the current code statement to be executed is distributed to a preset grid computing system for multi-thread parallel processing, and during the execution of this code statement, the user can continue to execute a next code statement, such that the user can make full use of the computing power of each compute node in the grid computing system to process tasks in parallel when processing a code that involves a large number of complex operations, thereby the code execution time is greatly shortened and the processing efficiency is improved.

BRIEF DESCRIPTION OF THE DRAWINGS

In order to explain the embodiments of the present invention more clearly, a brief introduction regarding the accompanying drawings that need to be used for describing the embodiments of the present invention or the prior art is given below; it is obvious that the accompanying drawings described as follows are only some embodiments of the present invention, for those skilled in the art, other drawings can also be obtained according to the current drawings on the premise of paying no creative labor.

DETAILED DESCRIPTION

In order to make the purpose, features and advantages of the present application more obvious and understandable, the technical solutions in the embodiments of the present application will be described clearly and completely in conjunction with the drawings in the embodiments of the present application. Obviously, the following described embodiments are only a part of the embodiments of the present application, but not all the embodiments. Based on the embodiments in the present application, other embodiments obtained by those skilled in the art without creative efforts are fall within the scope of protection of the present application.

The present application imbeds the support for parallel grid computing into the kernel of the language, and provides operators or keywords for parallel grid computing, such that the user can specify the code to run in parallel, and the data of the variables used in the specified code and the parallel code are automatically formed the task of parallel grid computing.

Figure 1:
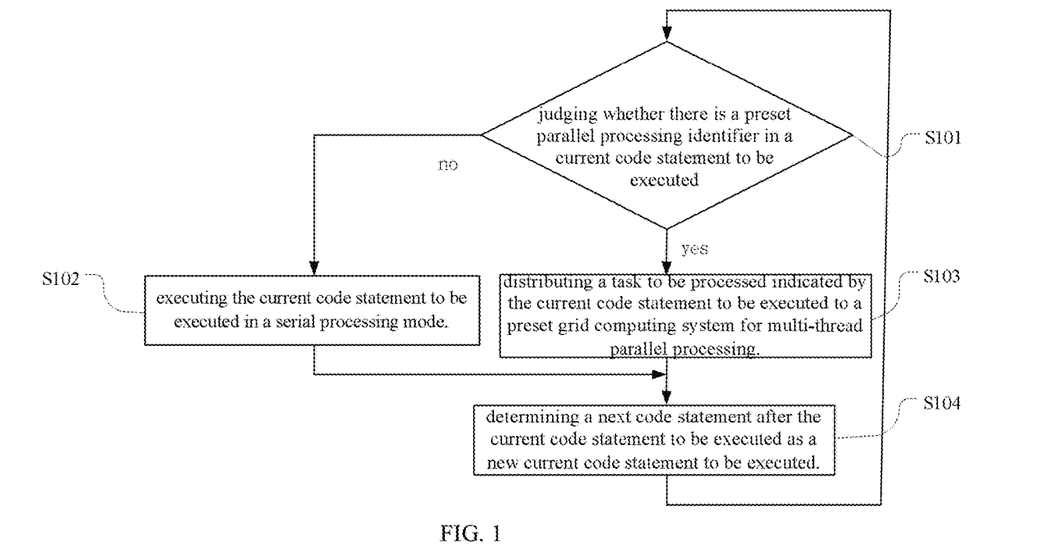
FIG. 1 is a schematic flowchart of a method for code execution provided by embodiment 1 of present application.

As shown in FIG. 1, which shows a schematic flowchart of a method for code execution provided by an embodiment of present application, the method can include:

Step S101, judging, during execution of a target code, whether there is a preset parallel processing identifier in a current code statement to be executed.

In the present embodiment, the parallel processing identifier may be composed of a specified symbol and/or keyword. For example, the symbol "#" may be selected as the parallel processing identifier.

If the parallel processing identifier does not exist in the current code statement to be executed, which indicate that there is no need to perform parallel processing on the current code statement to be executed, in this case, steps S102 and S104 are executed. If the parallel processing identifier is in the code statement, which indicates that the current code statement to be executed needs to be processed in parallel, and in this case, steps S103 and S104 are executed.

Step S102, executing the current code statement to be executed in a serial processing mode.

That is, according to the processing method in the prior art, only after the execution of the current code statement to be executed is completed and the result is returned, the next code statement will continue to be executed.

Step S103, distributing a task to be processed indicated by the current code statement to be executed to a preset grid computing system for multi-thread parallel processing.

The grid computing system includes more than two compute nodes. In the present embodiment, the task distribution and result return may be performed through a preset task distributor, which may be a single-machine multi-thread implementation or a multi-machine parallel network calculation.

In the process of task distribution, the task distributor needs to maintain load balance of each compute node. For example, the current number of tasks of each compute node in the grid computing system may be obtained respectively, and then calculating the number of tasks that can be processed by each compute node according to the current number of tasks of each compute node and a preset threshold of the number of tasks of each compute node; and finally distributing the task to be processed to the compute node with a largest number of tasks that can be processed for processing.

Figure 2:
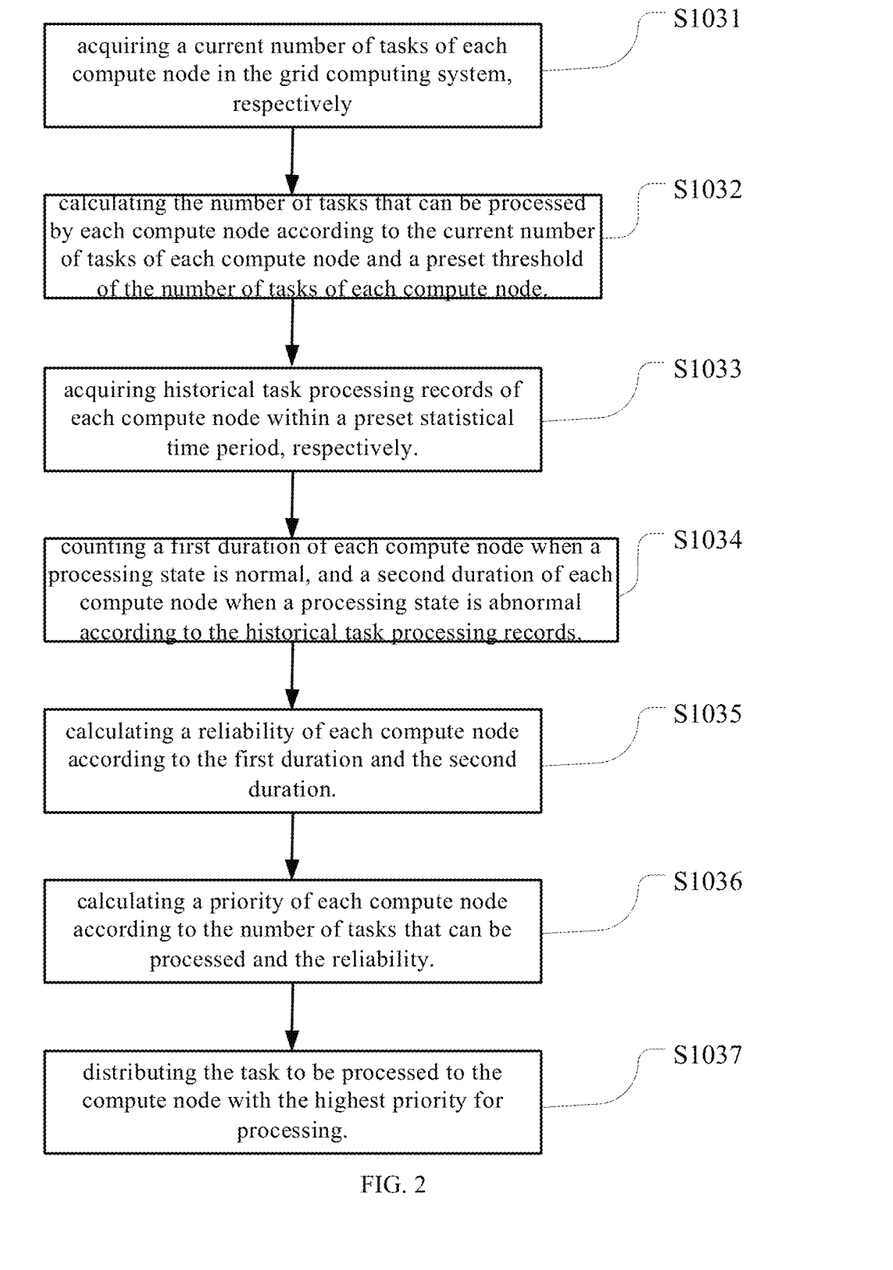
FIG. 2 is a schematic flowchart of a processing of task distribution.

Preferably, the algorithm shown in FIG. 2 may be used to achieve load balancing in the task distribution processing:

Step S1031, acquiring a current number of tasks of each compute node in the grid computing system, respectively.

The current number of tasks includes the number of tasks being processed and the number of tasks waiting to be processed.

Step S1032, calculating the number of tasks that can be processed by each compute node according to the current number of tasks of each compute node and a preset threshold of the number of tasks of each compute node.

The threshold of the number of tasks can be determined by the computing power of each compute node, and the two are positively correlated.

For example, the faster the processing speed of the compute node's CPU, the higher the corresponding threshold of the number of tasks, otherwise, the slower the processing speed of the CPU of the compute node, the lower the threshold of the corresponding threshold of the number of tasks.

The number of tasks that can be processed by a compute node may be the difference between the threshold of the number of tasks of the compute node and the current number of tasks of the compute node.

Step S1033, acquiring historical task processing records of each compute node within a preset statistical time period, respectively.

The statistical time period can be set according to the facts. For example, historical processing records of the previous month, the previous week, or the previous day can be taken for statistics, which is not specifically limited in this embodiment.

Step S1034, counting a first duration of each compute node when a processing state is normal, and a second duration of each compute node when a processing state is abnormal according to the historical task processing records.

The processing state being abnormal means that the task distributor receives abnormal feedback of a compute node or the compute node does not respond within a timeout.

Summing the processing time of a compute node when a processing state is normal to obtain the first duration of the compute node, and summing the processing time thereof hen a processing state is abnormal to obtain the second duration of the compute node.

Step S1035, calculating a reliability of each compute node according to the first duration and the second duration.

The reliability is used to characterize the stability of a compute node during the calculation process. The reliability of a compute node is positively related to its first duration and negatively related to its second duration. For example, the ratio of the first duration to the total duration may be used as the reliability, where the total duration is the sum of the first duration and the second duration.

Step S1036, calculating a priority of each compute node according to the number of tasks that can be processed and the reliability.

The priority being positively related to the number of tasks that can be processed and positively related to the reliability. For example, a first coefficient corresponding to the number of tasks that can be processed and a second coefficient corresponding to the reliability may be separately set, calculating a first product of the number of tasks that can be processed and the first coefficient, and a second product of the reliability and the second coefficient, and then calculating the sum of the first product and the second product, the larger the calculated sum, the higher the priority.

Step S1037, distributing the task to be processed to the compute node with the highest priority for processing.

It should be noted that the above process is only a feasible task distribution method, and other task distribution methods can also be selected according to actual needs, which is not specifically limited in this embodiment.

Step S104, determining a next code statement after the current code statement to be executed as a new current code statement to be executed.

After determining the new current code statement to be executed, it returns to step S101 until the target code is completely executed.

The present application can be used for large-scale distributed computing, implemented in a scripting language interpreter or a compiled language compiler, which can be used for parallel computing in a single machine, and can be applied to multiple machines in multiple machines parallel grid computing. For scripting languages, the user can directly submit the source code of the script and the required variables as tasks. For compiled languages, the user can choose to compile the code that needs to be parallelized into binary code that can be distributed and submitted, and submit it as a task together with the data. The user can also use the JIT mode, which submits the code and data to be compiled together as a task.

In this embodiment, a unified function source code center is provided, and subprograms called in parallel grid computing can be obtained through the unified source code center, and when the source code changes, the module providing parallel grid computing is notified in time. Using this method for parallel grid computing, the development is very convenient. From the perspective of the developer, there is no need to understand tasks and task decomposition methods, and it does not rely on parallel method libraries. It can be applied to the development of various unspecified parallel grid methods. In addition, the task of grid decomposition does not require any deployment, and can be developed and used at any time, and modified and run at any time.

In summary, the embodiments of the present application provide an identifier for parallel processing, and the user can use the parallel processing identifier to identify code statements that need to be processed in parallel in advance. During the execution of the code, when the parallel processing identifier is found in the current code statement to be executed, the task to be processed indicated by the current code statement to be executed is distributed to a preset grid computing system Perform multi-thread parallel processing. During the execution of this code statement, you can continue to execute the next code statement. When processing code that involves a large number of complex operations, you can make full use of the calculations of each compute node in the grid computing system. The ability to process tasks in parallel greatly shortens the code execution time and improves processing efficiency.

Embodiment 2

Figure 3:
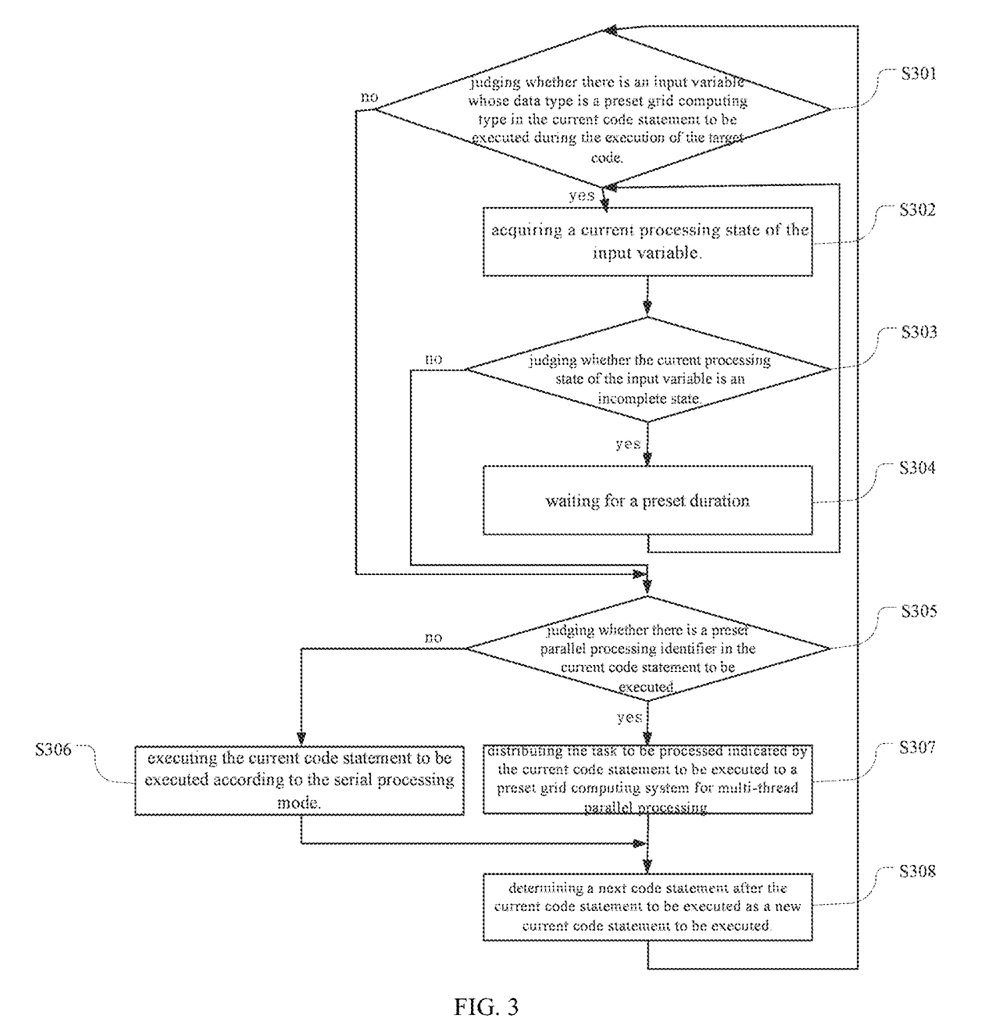
FIG. 3 is a schematic flowchart of a method for code execution provided by embodiment 2 of present application.

As shown in FIG. 3, a schematic flowchart of a method for code execution is provided, the method can include:

Step S301, judging whether there is an input variable whose data type is a preset grid computing type in the current code statement to be executed during the execution of the target code.

The grid computing type is a data type that requires multi-thread parallel processing in the grid computing system. In the present embodiment, the data type of grid computing is added to the data type of the language for storing parallel computing. When the language accesses the data type, such as assignment, operation, serialization, etc., it blocks to wait for the end of the parallel grid computing contained in the data. If the parallel computing is completed, the return value of the parallel grid computing is recorded in the data type.

If there is an input variable whose data type is the grid computing type in the current code statement to be executed, step S302 and subsequent steps are executed, and if there is no input variable whose data type is the grid computing type in the current code statement to be executed, step S305 and subsequent steps are executed.

Step S302, acquiring a current processing state of the input variable.

In the present embodiment, the processing state of the variable of the grid computing type includes a completed state and an incomplete state, where the incomplete state includes states such as waiting for submission, submitted, and errors. The processing state of grid computing type variables is used to describe the state of parallel tasks, and to record the necessary information for the execution of tasks in the submission state, which is used to terminate and resubmit tasks and so on.

Step S303, judging whether the current processing state of the input variable is an incomplete state.

If the current processing state of the input variable is an incomplete state, step S304 and subsequent steps are executed, and if the current processing state of the input variable is a completed state, step S305 and subsequent steps are executed.

Step S304, waiting for a preset duration.

The duration can be set according to the actual needs, and in particular, it can also be set to 0, that is, without waiting.

After waiting for the duration, return to step S302 until the current processing state of the input variable is the completed state.

Step S305, judging whether there is a preset parallel processing identifier in the current code statement to be executed.

If the parallel processing identifier does not exist in the current code statement to be executed, step S306 and step S308 are executed, and if the parallel processing identifier is in the current code statement to be executed, step S306 and Step S307 are executed.

Step S306, executing the current code statement to be executed according to the serial processing mode.

Step S307, distributing the task to be processed indicated by the current code statement to be executed to a preset grid computing system for multi-thread parallel processing.

Step S308, determining a next code statement after the current code statement to be executed as a new current code statement to be executed.

After determining the new current code statement to be executed, it returns to step S301 until the execution of the target code is completed.

The process from step S305 to step S308 is the same as step S101 to step S104 in the first embodiment. For details, please refer to the description in the first embodiment, and it is not repeatedly described herein.

Figure 4:
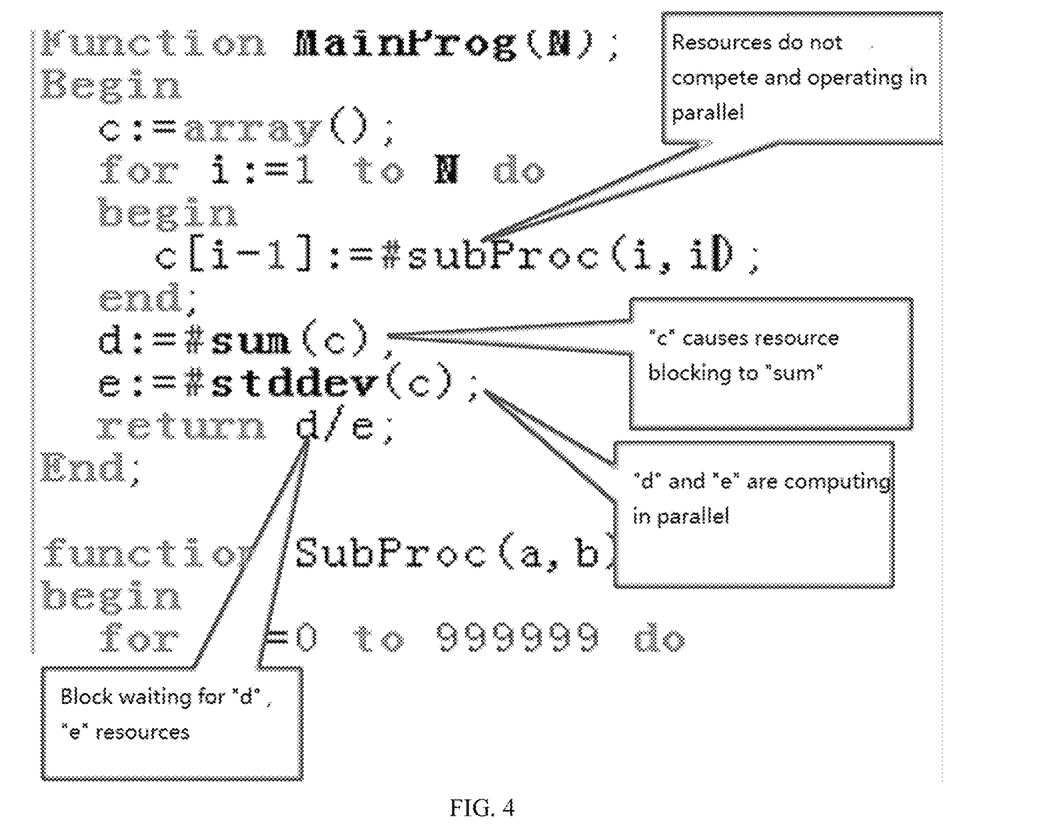
FIG. 4 is a schematic diagram of a specific example of parallel grid computing.

FIG. 4 is a specific example of parallel grid computing.

In this example, the symbol "#" is used as the parallel processing identifier, and the parallel grid computing is performed on the method after "#", and the program will continue in parallel when the result of the grid computing is not used until the result of the grid computing is accessed.

Specifically, in the formation of the array c, each step has nothing to do with the result of the previous grid computing, so parallel grid computing can be performed independently of each other. Here, a specific parallel "for" is not required. Through the using of the parallel processing identifiers, the traditional "for" has done a job similar to the parallel "for". The "subProc" is used to the data contained in the variable "i" by "#", and the code called by "subProc" form a task and submit it to the task distributor, and the grid computing type is putted into the array c. When accessing "c", such as summing "sum" or standard deviation "stddev", it will wait for the end of the grid computing task contained in "c", and d:=#sum(c) and e:=#stddev(c), since both depend directly on "c" but can be parallel to each other, such that the task of values of "sum" and "c" are placed in "d" grid computing type, and the task of values of "stddev" and "c" are placed in "e" grid computing type, and submitting two tasks to the task distributor, therefore, these two tasks are concurrent, and when returning the result of "d/e", it will wait for the end of the two grid computing types "d" and "e".

Preferably, the method for code execution may further include an exception handling process. Once an error occurs in the task execution unit, the task transfer is allowed. Specifically, the current processing state of each compute node in the grid computing system can be obtained, and if there is a compute node in the grid computing system whose current processing state is abnormal, the unprocessed task of the compute node whose current processing state is abnormal is transferred to the compute node whose current processing state is normal to continue processing.

The number of concurrent can also be set in the task distributor to prevent the number of concurrent from exceeding the limit. In this way, the task distributor can choose to queue or reject the overrun task.

Preferably, a task management mechanism can also be provided to check the state of parallel grid task assignment on the management side, allowing the manager to perform tasks such as task termination.

In summary, based on the first embodiment, the embodiments of the present application add a processing mechanism that the parallel grid computing is automatically blocked and waited during resource access, and the accessing always in parallel when there is no blocking of the parallel grid resources. This design allows nesting of parallel grids, and the number of parallel grids is not limited.

Embodiment 3

Figure 5:
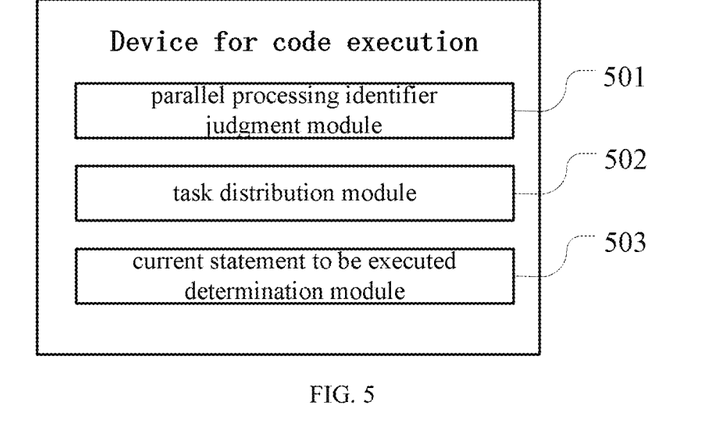
FIG. 5 is a schematic block diagram of a device for code execution provided by embodiment 3 of present application.

As shown in FIG. 5, a schematic block diagram of a device for code execution is provided by an embodiment of the present application, the device can include:

a parallel processing identifier judgment module 501, configured for judging, during execution of a target code, whether there is a preset parallel processing identifier in a current code statement to be executed;

a task distribution module 502, configured for distributing a task to be processed indicated by the current code statement to be executed to a preset grid computing system for multi-thread parallel processing if the parallel processing identifier is in the current code statement to be executed, wherein the grid computing system comprises more than two compute nodes;

a current statement to be executed determination module 503, configured for determining a next code statement after the current code statement to be executed as a new current code statement to be executed.

Further, the device for code execution can further include:

a grid computing type judgment module, configured for judging whether there is an input variable whose data type is a preset grid computing type in the current code statement to be executed, and the grid computing type is a data type that requires multi-thread parallel processing in the grid computing system;

a variable processing state acquiring module, configured for acquiring a current processing state of the input variable if there is an input variable whose data type is the grid computing type in the current code statement to be executed.

Further, the task distribution module can include:

a current number of tasks acquiring unit, configured for acquiring a current task number of each compute node in the grid computing system, respectively;

a number of tasks that can be processed calculation unit, configured for calculating the number of tasks that can be processed of each compute node according to the current number of tasks of each compute node and a preset threshold of the number of tasks of each compute node;

a first distribution unit, configured for distributing the task to be processed to the compute node with the largest number of tasks that can be processed for processing.

Further, the task distribution module can further include:

a processing record acquiring module, configured for respectively acquiring historical task processing records of each compute node within a preset statistical time period;

a duration statistics module, configured for counting a first duration of each compute node when a processing state is normal, and a second duration of each compute node when a processing state is abnormal according to the historical task processing records;

a reliability calculation module, configured for calculating a reliability of each compute node according to the first duration and the second duration, the reliability being positively related to the first duration and negatively related to the second duration;

a priority calculation module, configured for calculating a priority of each compute node according to the number of tasks that can be processed and the reliability, the priority being positively related to the number of tasks that can be processed and positively related to the reliability;

a second distribution unit, configured for distributing the task to be processed to the compute node with the highest priority for processing.

Further, the device for code execution may further include:

a node processing state acquiring module, configured for acquiring a current processing state of each compute node in the grid computing system;

a task transfer module, configured for transferring unprocessed tasks of the compute node whose current processing state is abnormal to the compute node whose current processing state is normal to continue processing if there is a compute node whose current processing state is abnormal in the grid computing system.

Those skilled in the art can clearly understand that for the convenience and conciseness of the description, the specific working process of the system, device and unit described above can refer to the corresponding process in the foregoing method embodiments, it is not repeatedly described herein.

It should be understood that the size of the sequence numbers of the steps in the above embodiments does not mean the order of execution. The execution order of each process should be determined by its function and inherent logic, and should not constitute any limitation on the implementation process of the embodiments of the present application.

Figure 6:
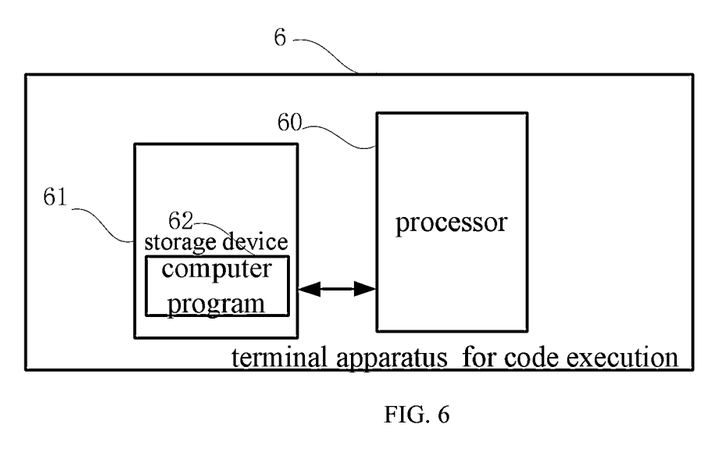
FIG. 6 is a schematic block diagram of a terminal apparatus provided by an embodiment of present application.

FIG. 6 is a schematic block diagram of a terminal apparatus for code execution provided by an embodiment of the present application.

As shown in FIG. 6, the terminal apparatus 6 for code execution of this embodiment includes: a processor 60, a storage device 61, and a computer program 62 stored in the storage device 61 and executable on the processor 60. When the processor 60 executes the computer program 62, the steps in the above embodiments of each method for code execution are implemented, for example, steps S101 to S104 shown in FIG. 2. Alternatively, when the processor 60 executes the computer program 62, the functions of each module/unit in the foregoing device embodiments are realized, for example, the functions of the modules 501 to 503 shown in FIG. 5.

Exemplarily, the computer program 62 can be divided into one or a plurality of modules/units, the one or plurality of modules/units are stored in the storage device 61, and executed by the processor 60 so as to implement the present application. The one or plurality of modules/units can be a series of computer program instruction segments that can accomplish particular functionalities, these instruction segments are used for describing an executive process of the computer program 62 in the terminal apparatus 6 for code execution. For example, the computer program 62 may be divided into a parallel processing identifier judgment module, a task distribution module, and a current statement to be executed determination module.

The terminal apparatus 6 for code execution may be a computing device such as a desktop computer, a notebook, a palmtop computer, and a cloud server. The terminal apparatus for code execution may include, but is not limited to, the processor 60 and the storage device 61. Those skilled in the art may understand that FIG. 6 is only an example of the terminal apparatus 6 for code execution and does not constitute a limitation on the terminal apparatus 6 for code execution, and may include more or less components than the illustration, or a combination of certain components, or different components, for example, the terminal apparatus 6 for code execution may further include an input and output device, a network access device, a bus, and the like.

The processor 60 can be CPU (Central Processing Unit), and can also be other general purpose processor, DSP (Digital Signal Processor), ASIC (Application Specific Integrated Circuit), FPGA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The storage device 61 can be an internal storage unit of the terminal apparatus 6 for code execution, such as a hard disk or a memory of the terminal apparatus 6 for code execution. The storage device 61 can also be an external storage device of the terminal apparatus 6 for code execution, such as a plug-in hard disk, a SMC (Smart Media Card), a SD (Secure Digital) card, a FC (Flash Card) equipped on the terminal apparatus 6 for code execution. Further, the storage device 61 may include both the internal storage unit and the external storage device of the terminal apparatus 6 for code execution, either. The storage device 61 is configured to store the computer programs, and other procedures and data needed by the terminal apparatus 6 for code execution for determining wellbore cross-sectional shape. The storage device 61 can also be configured to storing data that has been output or being ready to be output temporarily.

It can be clearly understood by the persons skilled in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units is independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, reference can be made to a corresponding process in the aforesaid method embodiments, it is not repeatedly described herein.

In the aforesaid embodiments, the description of each of the embodiments is emphasized respectively, regarding a part of one embodiment which isn't described or disclosed in detail, please refer to relevant descriptions in some other embodiments.

Those skilled in the art may aware that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium can be added or reduced appropriately according to the requirement of legislation and patent practice in a judicial district, for example, in some judicial districts, according to legislation and patent practice, the computer readable medium doesn't include electrical carrier signal and telecommunication signal.

As stated above, the aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A method for code execution, comprising:
   judging, during execution of a target code, whether there is a preset parallel processing identifier in a current code statement to be executed;
   distributing a task to be processed indicated by the current code statement to be executed to a preset grid computing system for multi-thread parallel processing if the parallel processing identifier is in the current code statement to be executed, wherein the grid computing system comprises more than two compute nodes; and determining a next code statement after the current code statement to be executed as a new current code statement to be executed, then returning to execute the step of judging whether there is a preset parallel processing identifier in a current code statement to be executed until execution of the target code is completed.

2. The method for code execution according to claim 1, wherein before judging whether there is a preset parallel processing identifier in a current code statement to be executed, the method further comprising:

judging whether there is an input variable whose data type is a preset grid computing type in the current code statement to be executed, and the grid computing type being a data type that requires multi-thread parallel processing in the grid computing system;

acquiring a current processing state of the input variable if there is an input variable whose data type is the grid computing type in the current code statement to be executed;

returning to execute the step of acquiring the current processing state of the input variable until the current processing state of the input variable being a completed state if the current processing state of the input variable is an incomplete state; and executing the step of judging whether there is a preset parallel processing identifier in a current code statement to be executed if the current processing state of the input variable is a completed state.

3. The method for code execution according to claim 1, wherein the step of distributing a task to be processed indicated by the current code statement to be executed to a preset grid computing system for multi-thread parallel processing comprises:

acquiring a current number of tasks of each compute node in the grid computing system, respectively;

calculating a number of tasks that can be processed by each compute node according to the current number of tasks of each compute node and a preset threshold of the number of tasks of each compute node; and distributing the task to be processed to the compute node with a largest number of tasks that can be processed for processing.

4. The method for code execution according to claim 3, wherein the step of distributing a task to be processed indicated by the current code statement to be executed to a preset grid computing system for multi-thread parallel processing further comprises:

acquiring historical task processing records of each compute node within a preset statistical time period, respectively;

counting a first duration of each compute node when a processing state is normal, and a second duration of each compute node when a processing state is abnormal according to the historical task processing records;

calculating a reliability of each compute node according to the first duration and the second duration, the reliability being positively related to the first duration and negatively related to the second duration;

calculating a priority of each compute node according to the number of tasks that can be processed and the reliability, the priority being positively related to the number of tasks that can be processed and positively related to the reliability; and distributing the task to be processed to the compute node with the highest priority for processing.

5. The method for code execution according to claim 1, further comprising:

acquiring a current processing state of each compute node in the grid computing system; and transferring unprocessed tasks of the compute node whose current processing state is abnormal to the compute node whose current processing state is normal to be continuously processed if there is a compute node whose current processing state is abnormal in the grid computing system.

6. A device for code execution, comprising:

a parallel processing identifier judgment module, configured for judging, during execution of a target code, whether there is a preset parallel processing identifier in a current code statement to be executed;

a task distribution module, configured for distributing a task to be processed indicated by the current code statement to be executed to a preset grid computing system for multi-thread parallel processing if the parallel processing identifier is in the current code statement to be executed, wherein the grid computing system comprises more than two compute nodes; and a determination module, configured for determining a next code statement after the current code statement to be executed as a new current code statement to be executed.

7. The device for code execution according to claim 6, further comprising:

a grid computing type judgment module, configured for judging whether there is an input variable whose data type is a preset grid computing type in the current code statement to be executed, and the grid computing type is a data type that requires multi-thread parallel processing in the grid computing system; and a variable processing state acquiring module, configured for acquiring a current processing state of the input variable if there is an input variable whose data type is the grid computing type in the current code statement to be executed.

8. The device for code execution according to claim 6, wherein the task distribution module comprises:

an acquiring unit, configured for acquiring a current number of tasks of each compute node in the grid computing system, respectively;

a calculation unit, configured for calculating a number of tasks that can be processed of each compute node according to the current number of tasks of each compute node and a preset threshold of the number of tasks of each compute node; and a first distribution unit, configured for distributing the task to be processed to the compute node with the largest number of tasks that can be processed for processing.

9. A terminal device for code execution, comprising: a storage device, a processor, and a computer program stored in the storage device and executable on the processor; wherein the steps of the method for code execution according to claim 1 are implemented when the processor executes the computer program.

10. A non-transitory computer readable storage medium which stores a computer program, wherein the steps of the method for code execution according to claim 1 are implemented when a processor executes the computer program.

11. The method for code execution according to claim 2, further comprising:

acquiring a current processing state of each compute node in the grid computing system;

transferring unprocessed tasks of the compute node whose current processing state is abnormal to the compute node whose current processing state is normal to continue processing if there is a compute node whose current processing state is abnormal in the grid computing system.

12. The method for code execution according to claim 3, further comprising:
   acquiring a current processing state of each compute node in the grid computing system; and
   transferring unprocessed tasks of the compute node whose current processing state is abnormal to the compute node whose current processing state is normal to continue processing if there is a compute node whose current processing state is abnormal in the grid computing system.

13. The method for code execution according to claim 4, further comprising:
   acquiring a current processing state of each compute node in the grid computing system; and
   transferring unprocessed tasks of the compute node whose current processing state is abnormal to the compute node whose current processing state is normal to be continuously processed if there is a compute node whose current processing state is abnormal in the grid computing system.

14. The device for code execution according to claim 7, wherein the task distribution module comprises:
   an acquisition unit, configured for acquiring a current task number of each compute node in the grid computing system, respectively;
   a calculation unit, configured for calculating a number of tasks that can be processed of each compute node according to a current number of tasks of each compute node and a preset threshold of the number of tasks of each compute node; and
   a first distribution unit, configured for distributing the task to be processed to the compute node with the largest number of tasks that can be processed for processing.

* * * * *